(12) United States Patent
Srinivasan et al.

(10) Patent No.: US 8,996,616 B2
(45) Date of Patent: Mar. 31, 2015

(54) CROSS-LINKING FROM COMPOSITE IMAGES TO THE FULL-SIZE VERSION

(75) Inventors: Balaji Srinivasan, Fremont, CA (US); Brett Rolston Lider, San Francisco, CA (US); Zach Yeskel, San Francisco, CA (US); Alison Boncha, San Francisco, CA (US)

(73) Assignee: Google Inc., Mountain View, CA (US)

( * ) Notice: Subject to any disclaimer, the term of this patent is extended or adjusted under 35 U.S.C. 154(b) by 239 days.

(21) Appl. No.: 13/597,914

(22) Filed: Aug. 29, 2012

(65) Prior Publication Data

US 2014/0067932 A1    Mar. 6, 2014

(51) Int. Cl.
  *G06F 15/16*    (2006.01)
  *H04L 12/58*    (2006.01)
  *G06F 17/30*    (2006.01)

(52) U.S. Cl.
  CPC .......... *H04L 51/32* (2013.01); *G06F 17/30247* (2013.01)
  USPC ............ 709/204; 709/205; 709/206; 709/207

(58) Field of Classification Search
  None
  See application file for complete search history.

(56) References Cited

U.S. PATENT DOCUMENTS

2011/0044512 A1    2/2011  Bambha
2011/0312424 A1*  12/2011  Burckart et al. ................ 463/42
2012/0114199 A1    5/2012  Panyam et al.
2012/0278395 A1*  11/2012  Garcia ........................... 709/205
2013/0346075 A1*  12/2013  Felkai et al. ................... 704/235
2014/0044358 A1*   2/2014  Srinivasan et al. ............ 382/190

FOREIGN PATENT DOCUMENTS

GB     2378340 A      2/2003
WO   2009156184 A1  12/2009

OTHER PUBLICATIONS

International Search Report, dated Mar. 6, 2014, for related PCT Application No. PCT/US2013/057155.
Gianluigi Ciocca et al., "Self-Adaptive Image Cropping for Small Displays", IEEE Transactions on Consumer Electronics, IEEE Service Center, New York, NY, US, vol. 53, No. 4, Nov. 1, 2007, pp. 1622-1627.

* cited by examiner

*Primary Examiner* — Brian P Whipple
(74) *Attorney, Agent, or Firm* — IP Spring

(57) ABSTRACT

Methods and systems that provide for cross-linking from composite images that include receiving, over a computer network, a source image and then associating a first identifier tag with a first object in the source image. A composite image is generated from the source image, wherein the composite image includes a cropped image of the first object. Then a first user is notified that the first identifier tag is associated with the first object in the cropped image and also includes a copy of the composite image. Additionally, the user can select the first object in the composite image and be linked to the source image that contains the selected first object where the first object is highlighted.

21 Claims, 10 Drawing Sheets

CROSS-LINKING FROM COMPOSITE IMAGES TO THE FULL-SIZE VERSION

BACKGROUND

The Internet provides access to a wide range of resources with one of the fastest growing uses being social media. Social media includes web-based and mobile-based technologies that provide for interactive dialogues of user-generated content. Such content includes text, photos, videos, magazines, internet forums, weblogs, social blogs, podcasts, rating, geographic tracking, and social bookmarking.

Using social media a user can post a piece of content, e.g., a photo, and within seconds that content is accessible by a large number of people and in some cases over one-hundred million people. Such access to information is both exhilarating and also daunting. For example, a photo of a person could get posted to a social media site, which results in that person receiving a message that they have been tagged in a photo. The message indicates that a photograph that includes their image, and possibly images of numerous other people or objects, has been posted to the social media site, but gives no indication as to the contents of the image. The photographed person has no immediate indication of the contents of the photo without further investigation.

BRIEF SUMMARY

Embodiments include systems and methods for generating a composite image from a captured or source image where the composite image contains intelligently cropped images of identified objects. Objects can be anything that can be identified, including people.

According to an embodiment, a method is presented that provides for cross-linking from composite images that includes receiving, over a computer network, a source image and then associating a first identifier tag with a first object in the source image. The method continues by generating a composite image from the source image, wherein the composite image includes a cropped image of the first object. The method continues by notifying a first user that the first identifier tag is associated with the first object in the cropped image and also includes a copy of the composite image. Additionally, the user can select the first object in the composite image and be linked to the source image that contains the selected first object where the first object is highlighted.

According to another embodiment, a method is presented that provides for cross-linking from composite images that includes receiving a notification that a first identifier tag is associated with a first object in the source image. The method also includes that the received notification includes receiving a composite image where the composite image is based on a cropped image of the first object. Additionally, the user can receive the source image in response to the user selecting a first object in the composite image where the first object is highlighted in the received source image.

According to another embodiment, a system is provided that includes a processor, memory coupled to the processor, an image storage module, an association module, art image cropping module, and a notification module. The image storage module stores uploaded source images. The association module associates a first identifier tag with a first object in the source image. The image cropping module generates a composite image from the source image where the composite image includes a cropped image of the first object. The notification module notifies a first user that the first identifier tag is associated with the first object in the cropped image and also includes a copy of the composite image in the notification. Additionally, the user can select the first object in the composite image and be linked to the source image that contains the selected first object where the first object is highlighted.

Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

The accompanying drawings, which are incorporated, herein and form part of the specification, illustrate embodiments of the present invention and, together with the description, further serve to explain the principles of the invention and to enable a person skilled in the relevant art(s) to make and use the invention.

DETAILED DESCRIPTION

I. Introduction

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

What are needed are systems and methods that intelligently crop identified objects from a full size source image posted to a social media website, and generate a composite image containing all of the objects, where when a user selects one of the object images within the composite image, they are linked to the full size source image. The source image can be an image obtained from an image capture device, a camera, or it can be a synthetically generated image.

Social media may refer to any form of internet based communication that allows for the creation and exchange of user-generated content. Cropping of an image refers to the identification and/or removal of an area of an image. Cropping is typically performed to remove unwanted subject material from the image to improve the overall composition of the image, to emphasize a certain set of subject matter, or to remove subject matter that is undesirable in a particular situation. Cropping is also performed to compensate for different aspect ratios. For example a widescreen 16:9 format may be cropped to a 1:1 ratio for display on a mobile device.

A composite image refers to the combining of multiple images together into a single image. Also known as a photomontage, the combining of multiple images can appear to the user to be a seamless single image, or can consist of multiple distinct separate segments. Throughout this application the composite images shown are as a collection of distinct separate images, but are not meant to imply any such restriction.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

Figure 1:
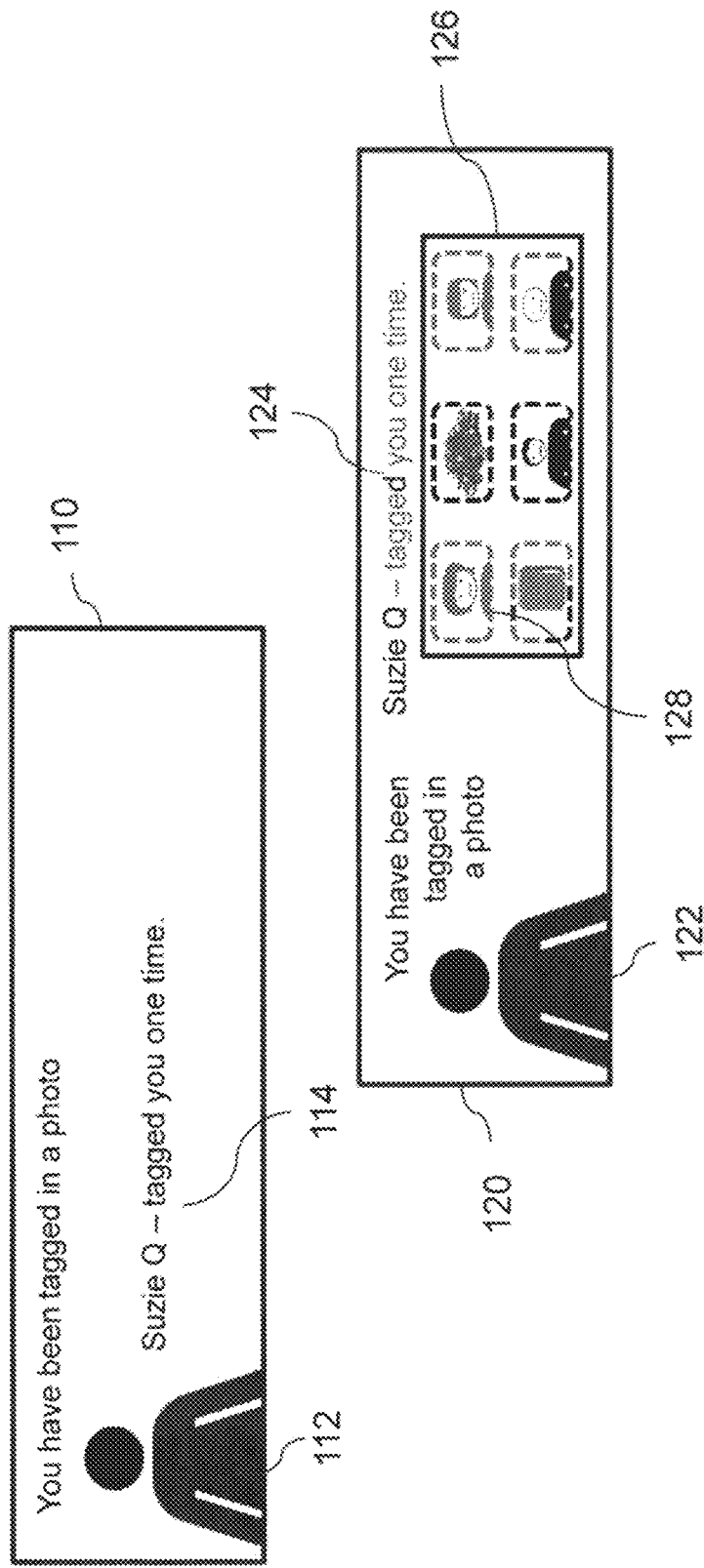
FIG. 1 illustrates an example notification in a social media system with and without a composite image, according to an embodiment.

FIG. 1 illustrates two example notifications possible in a social media system, according to an embodiment of the present invention. Notification 110 illustrates a notification to a user that includes the user's icon 112 and a message 114. In this example, message 114 informs the user that "Suzie Q" has posted an image that supposedly includes a photo that contains an image of the user. In this example message 114 includes only text and does not give the user an indication of what image has been posted.

Notification 120 illustrates a notification to a user that includes the user's avatar icon 122 and a message 124, which as in notification 110, notifies the user that "Suzie Q" has posted an image that supposedly includes a photo that contains an image of the user. However, notification 120 also includes a composite image 126 of the photo that includes the supposed image of the user 128. In this manner the user is able to quickly identify the actual photo that was posted, as well as view a collection of the identified objects that are also in the posted photo.

II. System Overview

Figure 2:
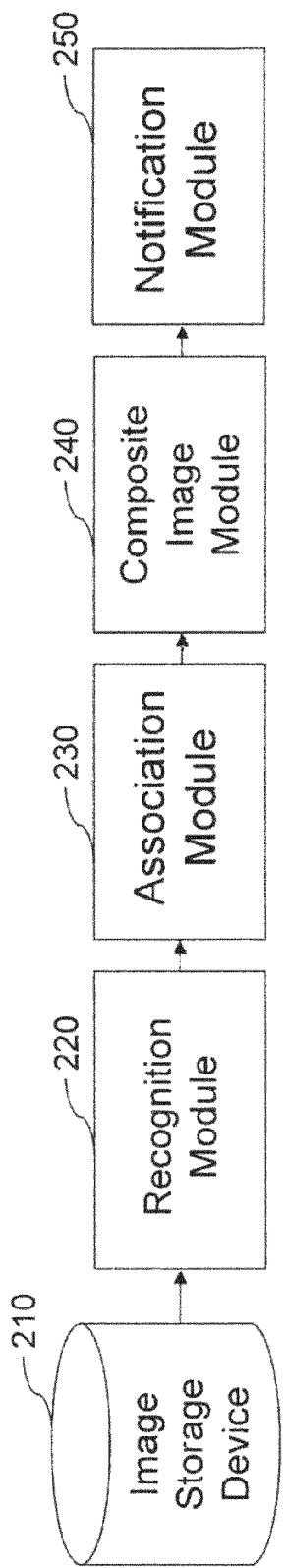
FIG. 2 illustrates a cross-linking composite image system, according to an embodiment.

FIG. 2 illustrates a cross-linking composite system 200, according to an embodiment. Cross-linking composite system 200 includes an image storage device 210, a recognition, module 220, an association module 230, a composite image module 240, and a notification module 250.

Image data is received and stored in image storage device 210 where the image data can exist in any defined image format, for example, jpg, bmp, exif, tiff, raw, png, gif, ppm, pgm, pbm, pnm, cgm, svg, pns, jps, or mpo, or any other format, whether the image is two dimensional or three dimensional. Image data storage device 210 may exist as a standalone device or be integrated into another device such as a mobile communications device, digital camera, or any other image capture device.

Recognition module 220 analyzes a source image to identify objects and/or people within the image. Recognition can include not only identifying a person, or a person's face, but can also compare the identified features to a feature database (not shown) to identify a name associated with the face. In the same manner, recognition module 220 can identify objects within the image and through a feature database to recognize various logos, e.g., a canned beverage is a Coca-Cola branded product. Objects can be anything, such as an animal, a brand, a plant, etc.

Association module 230 uses the analysis of recognition module 220 to associate an identifier tag with an identified object or person within the source image. Association module 230 can generate multiple identifier tags to be associated with multiple objects and/or persons within an image. Association module 230 may also generate tags based upon the affinity of the recipient to the object in question. For example, if the source image contains a Coke can and the recipient had previously post about soda or Coke, then Association module 230 can tag that object.

Composite image module 240 intelligently crops the source image based on the objects and/or people identified by recognition module 220 and associations made by association module 230. In an embodiment, composite image module 240 intelligently and automatically crops the source image based and generates a composite image containing the identified people/objects. In another embodiment, a user will perform the functions of recognition module 220 and association module 230 by identifying and associating a person or object of interest. Alternatively, a semi-automatic approach can be implemented that uses both recognition module 220 and association module 230 and further allows a user to provide, revise, update, or confirm recognized objects and/or people identified and associations made.

Composite image module 240 will then crop the image based on the identification and association performed either by system 200 and/or a user. Composite image module 240, in response to a user selecting an identified object within the composite image, links the user to the source image with the selected object highlighted. The methodology behind the cropping and generation of the composite image will be discussed in further detail later.

Figure 3:
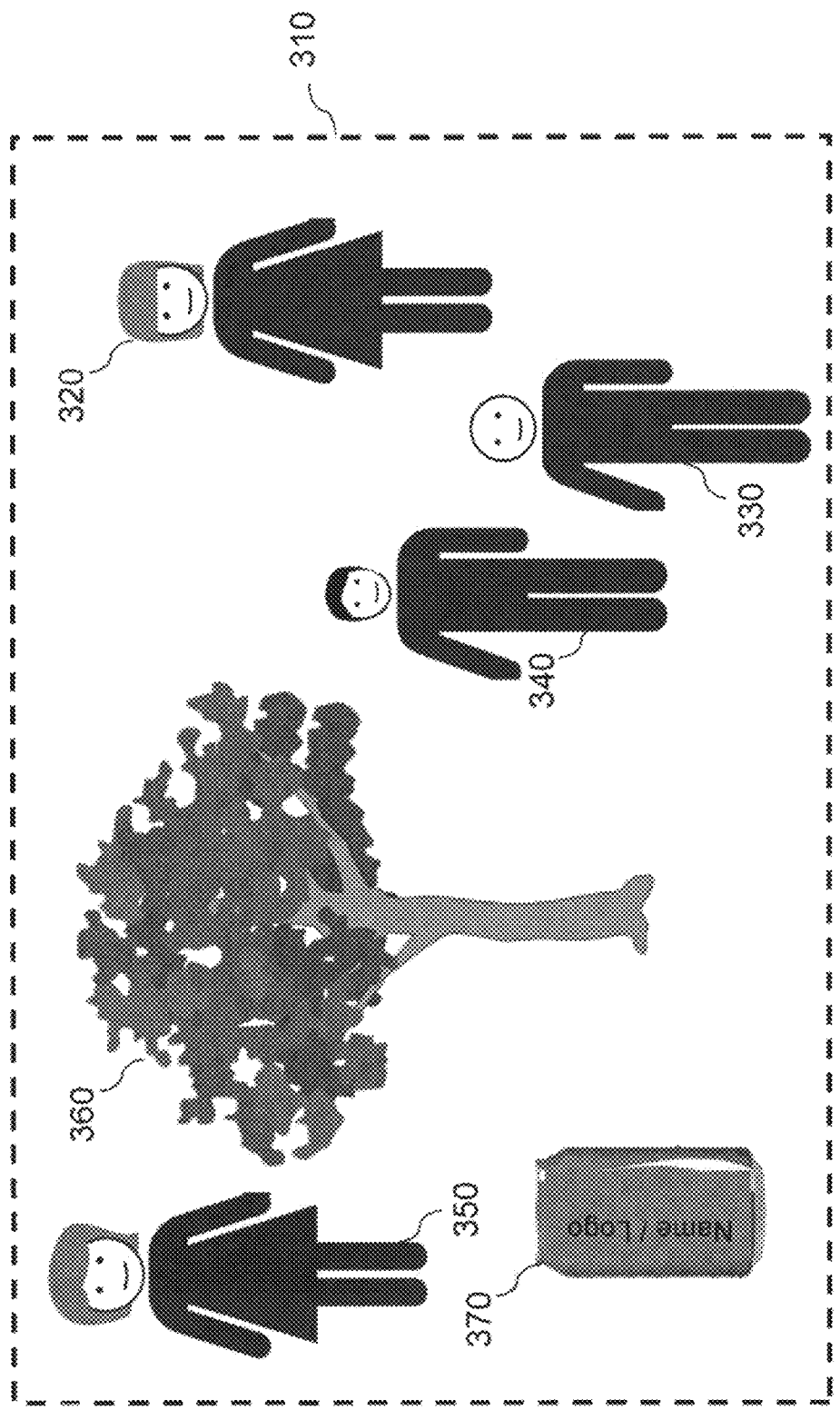
FIG. 3 is an example source image illustrating identified objects, according to an embodiment.

Notification module 250 notifies the person or object that was associated with an identifier tag of the existence of the cropped image and that the associated person or object exists within the cropped image. Notification module 250 also delivers a copy of the composite image to the associated person or object III. Captured/Associated Image FIG. 3 is an example source image 310, according to an embodiment. Source image 310 includes both objects and people. For example, source image 310 includes persons 320, 330, 340 and 350. Source image 310 also includes objects 360 and 370, where object 360 is a tree and object 370 is a branded beverage can.

The people and objects in source image 310 can either manually or automatically, using a computer-based system, be recognized. Persons 320, 330, 340 and 350 can be automatically recognized and thus associated with an identifier tag using a facial recognition system, or manually by another person. Objects, such as object 370, can be recognized, and associated with an identifier tag based on shape, character recognition, or by logo. Objects, such as object 360, can likewise be identified as a tree, either automatically or manually.

IV. Intelligent Cropping and Composite Image Generation

Figure 4:
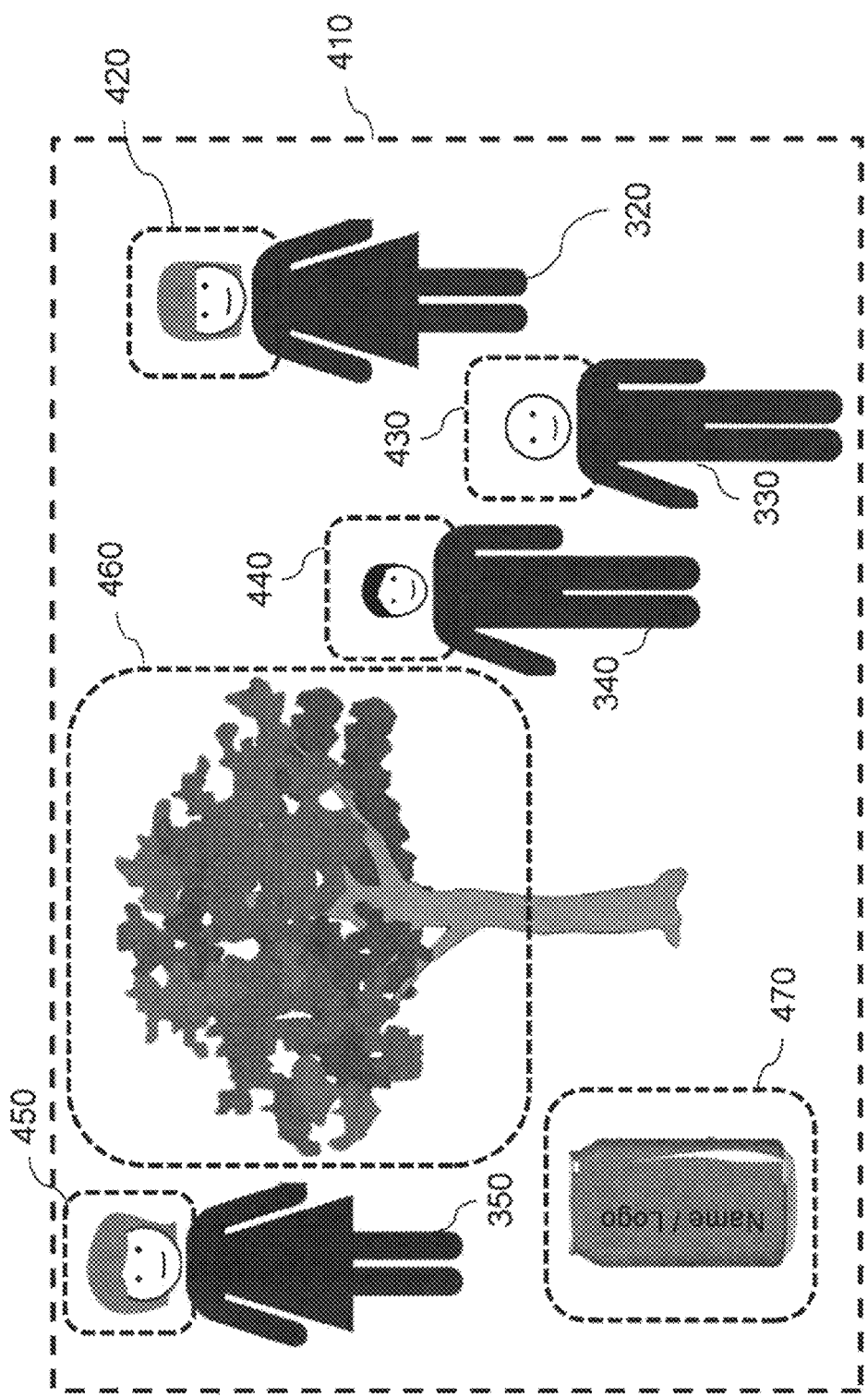
FIG. 4 illustrates multiple identified objects within the source image based on the status of the person or object receiving a notification, according to an embodiment.

FIG. 4 is an example source image 410 with multiple intelligent cropped areas, according to an embodiment. Source image 410 includes both objects and people that have been identified and associated with an identifier tag. Intelligent cropping is based on a set of pre-defined rules consistent with a social media website that would guide the actions of composite image module 240. For example, the person that took image 410 is considered the owner of the image. The owner has access to all of the images contained within image 410. However, for example, if the owner posts image 410 to a social media website and a third party recognizes one of the individuals in the image, e.g., person 320, then person 320 would receive a notification that they have been tagged in a photo. Cross-linking composite system 200 would create a composite image that would only include cropped area 420 that includes person 320.

In another embodiment, the cropped area would include the person 320 and an amount of area around person 320 to give some context as to the location or situation surrounding person 320. In general, cropping of the image is necessary as there is not enough space to display the entire image in the summary view of the notification. Therefore, the priority is to notify the user that they have been tagged and limit the image to include only person 320. In an embodiment, the owner of the photo receives a notification that includes a composite image including images of everyone that has been tagged. In another embodiment, the user's notification would include a composite image that includes image of everyone that has been tagged.

Figure 5:
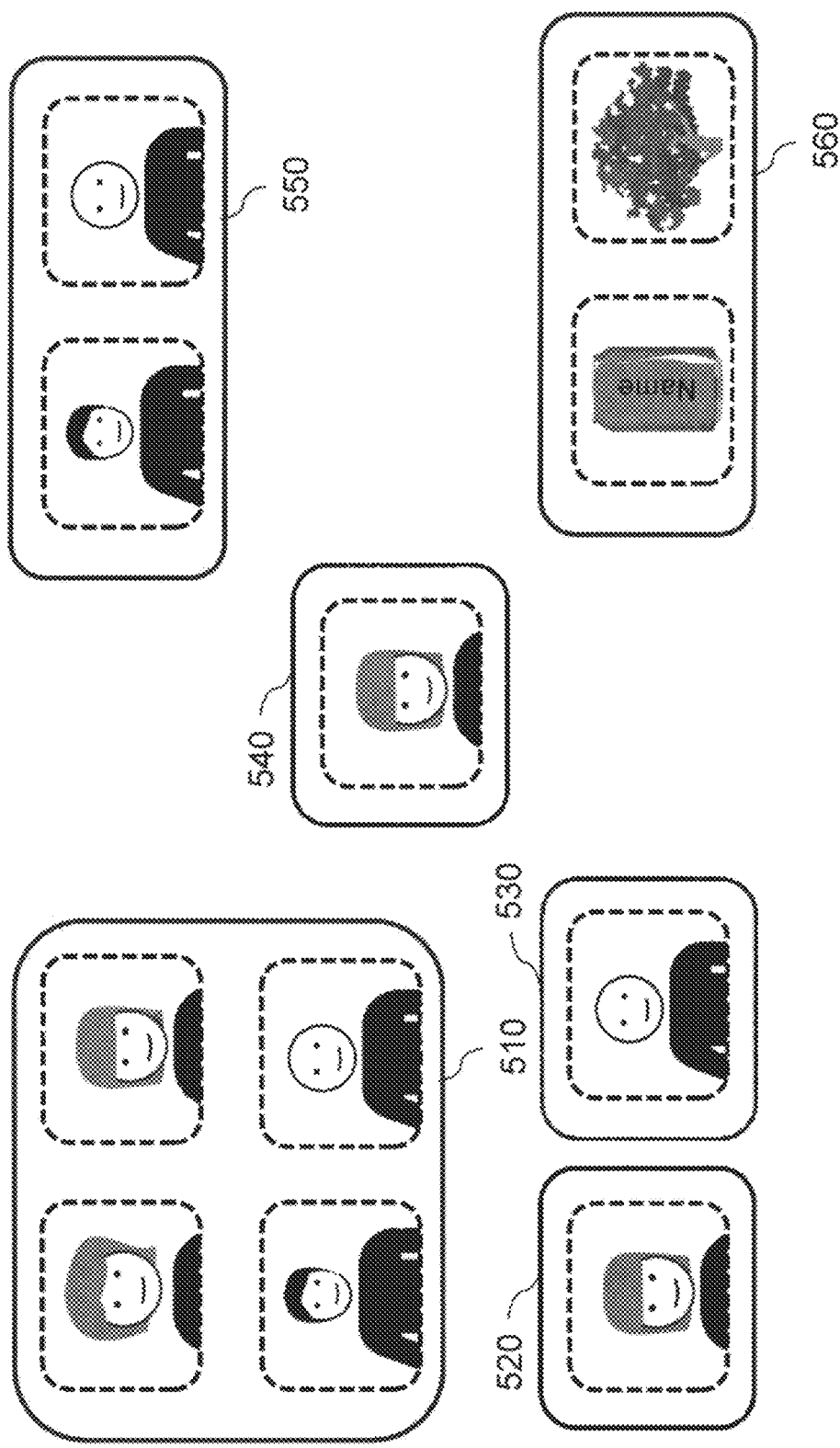
FIG. 5 illustrates composite images of the cropped images from FIG. 4, according to an embodiment.

In a similar manner, cross-linking composite system 200 generates a number of additional cropped areas of image 410 in response to rules regarding a social media website. FIG. 5 illustrates the results below in sample composite images, according to an embodiment.

Cross-linking composite system 200 uses pre-defined rules to crop an image that are based on an image's resolution, aspect ratio, pixel size and density of a sending and receiving display device. In addition, the rules can be based on the identity of the view, their relationship to the objects or people in the image, who owns the image, the actors in the image, and the identity of the person who tagged an object or person in the image.

In an embodiment, the rules that control access to the content of the composite image include the following rules R1-RX. For rules R1-RX, the following terms apply: A "poster" is a person who posts an image to the social networking system. This poster may or may not be the copyright holder of the image. A poster can also be referred to as an "owner" as discussed above. A "connected third-party" is a person who is connected to the poster in the social networking system. An "unconnected third-party" is person who is not connected to the poster in the social networking system.

Rules R1-RX are non-limiting and intended to be illustrative. Rules R1-RX are listed below:

R1. When a poster posts an image, that person can view all parts of the image. For example all tagged people in an image are visible to the poster of the image without restriction.

R2. When an image is posted to a social media website, any third party can identify and tag another third party in the image.

R3. When a third party within a posted image has been identified and tagged, the poster of the image is notified. This notification to the poster includes the identity of the third party that performed the identification and tagging R4. When a third party is tagged in an image, a notification will be sent to the third party. Optionally, this notification includes an indication of other tagged third parties in the image.

R5. In a variation of R4, when a third party is tagged in an image, within the notification to the tagged third party, a composite image is provided that includes images of other tagged third parties in the image. Optionally, only people or objects who are connected to the tagged third party are included in the notification. Therefore, a tagged third party will receive a composite image of another tagged third parties or objects to whom they are connected in the social media website.

R6. When a search is performed, a posted image with tagged third parties and/or objects can be provided as a result in a list of results. The results of a search generates a composite image that includes the searched upon object or third party.

As would be appreciated by one having skill in the relevant art(s), rules R1-RX can be used individually or in combination. Fewer or additional rules can be used by different embodiments.

Given the above rules, the following scenarios describe possible scenarios used by cross-linking composite system 200, and composite image module 240:

Scenario #1

Owner captures image 410 and posts it to a social media website

Third party person A recognizes persons 320, 330, 340 and 350 in the posted photo and tags persons 320, 330, 340 and 350

Owner receives a notification that third party person A has tagged persons 320, 330, 340 and 350. Cross-linking composite system 200 creates a composite image 510 shown in FIG. 5 that would include cropped images 420, 430, 440 and 450 that includes all four tagged people's faces with an appropriate, based on an analysis of the image composition, amount of additional image. The notification also includes a copy of composite image 510.

Person 320 will receive a notification that she has been tagged in a photo where cross-linking composite system 200 creates composite image 520 that includes her face and the immediate area around her, which could also include other adjacent faces. In addition, the notification can include the names of other people or things that are also tagged in the same photo.

Person 330 will receive a notification that he has been tagged in a photo where cross-linking composite system 200 creates composite image 530 that includes only his face and the immediate area around him.

Person 340 will receive a notification that he has been tagged in a photo where cross-linking composite system 200 creates composite image 540 that includes only his face and the immediate area around him.

Scenario #2

Owner captures image 410 and posts it to a social media website

Third party person B receives a post that persons 330 and 341) have been tagged. Third party person B is connected to persons 330 and 340, hut not with person 320. Cross-linking composite system 200 creates a composite image 550 that includes only persons 330 and 340, not person 320.

Scenario #3

Owner captures image 410 and posts it to a social media website

Third party person C enters a search for an image that includes a tree and a "name hand" beverage. Cross-linking composite system 200 creates a composite image 560 that includes the cropped area 450 of the tree and cropped area 460 showing the brand name beverage can.

Intelligent image cropping is also performed based on environmental factors such as display characteristics of the receiving device. For example, a source image in a 16:9 format, when displayed on a screen/device with a 4:3 format would be cropped accordingly to conform with the display characteristics of the receiving device. In a similar fashion, the cropped image would also be adjusted according to screen density, or resolution of the source image, to allow for the appropriate display of a cropped image.

V. Composite Image Placement

Figure 6:
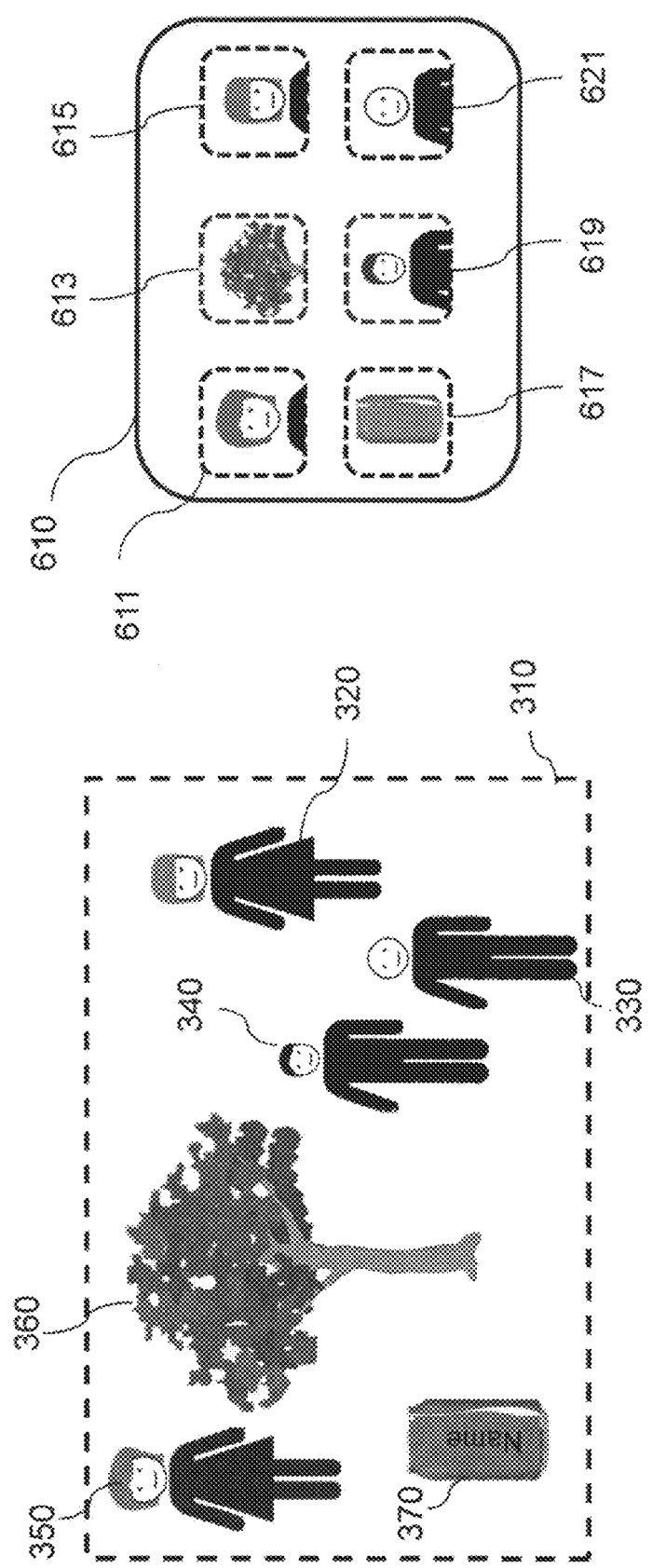
FIG. 6 illustrates relative placement of cropped images in a composite image in relationship to the source image, according to an embodiment.

FIG. 6 is an example of cropped image placement in a composite image, according to an embodiment. Source image 310 contains four people 320, 330, 340 and 350, as well as objects 360 and 370. When composite image module 240 generates a composite image containing cropped images, the placement of the cropped images within the composite image can be random, or can be arranged to mimic the placement of the people/objects in the captured photo. Composite image 610 is an illustration of relative placement of the cropped images. For example, cropped image 611 is placed in the upper left position of composite image 610 in the same relative position that the image of person 350 is placed in captured photo 310. The same relative positioning applies to cropped images 613, 615, 617, 619 and 621. Such relative placement allows a viewer of composite image 610 to more easily visualize the layout and placement of the people/objects in source image 310.

VI. Cross-Linking of Composite Image to Source Image

Figure 7:
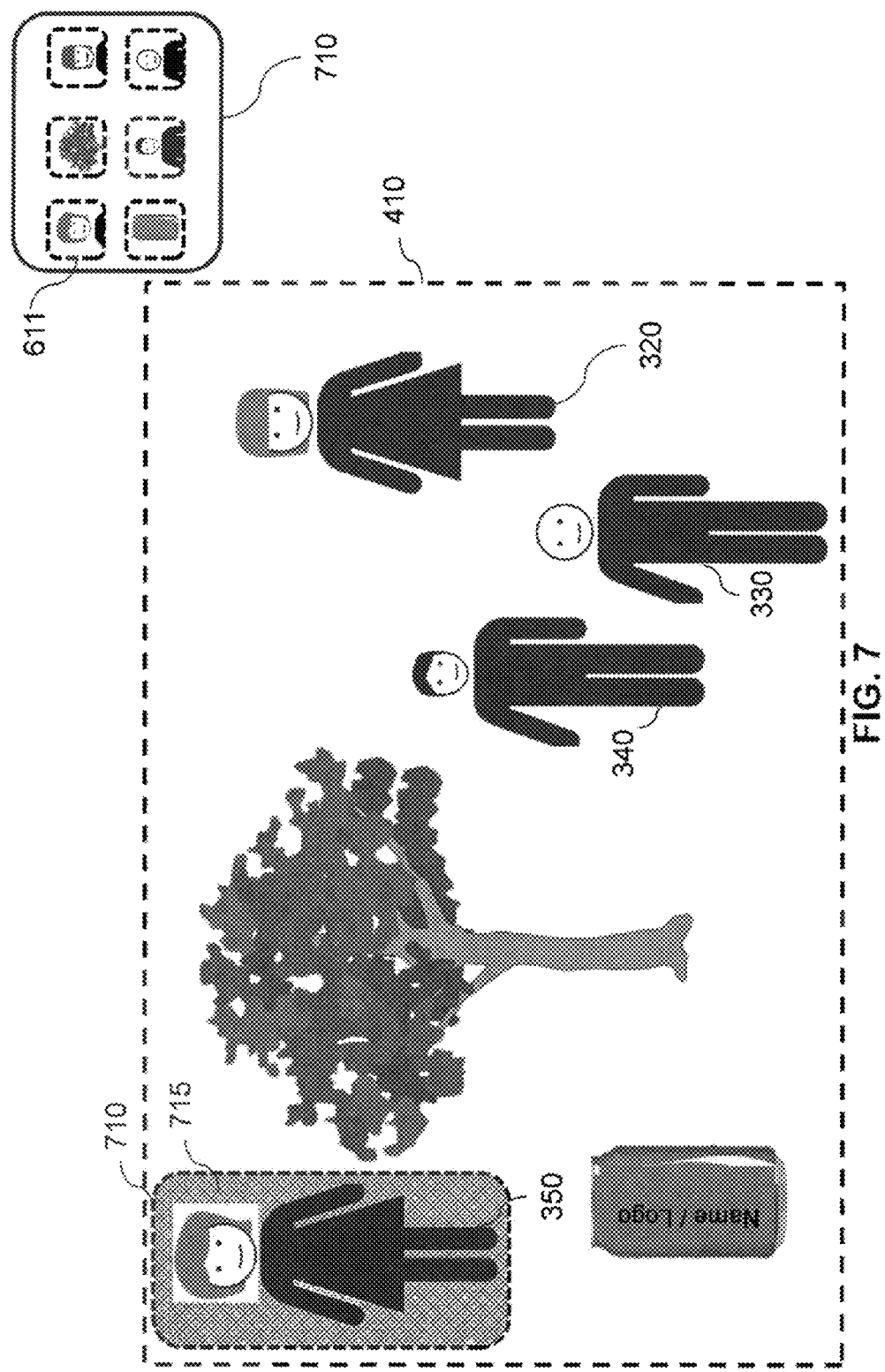
FIG. 7 illustrates a cross-linking of an object in the composite image with the highlighted object in the source image, according to an embodiment.

FIG. 7 is an illustration of cross-linking between a composite image and the source image from which the composite image was created, according to an embodiment. As discussed above, notification module 250 sends a notification, such as notification 120 to a user. The notification includes a copy of a composite image containing identified people and/or objects, such as composite image 126 in FIG. 1, or composite image 710 in FIG. 7.

When the user is presented with composite image 710 the user has the option of selecting any of the cropped image portions within composite image 710. Selection of a particular cropped image in the composite image results in the user receiving a copy of the source image from which the composite image was generated with the corresponding portion of the selected cropped image being highlighted. For example, the user would receive composite image 710 and select the upper left cropped image 611. Cropped image 611 is a cropped image of person 350 in source image 410. Upon selecting cropped image 611, the user is cross-linked to source image 410 that contains the entire image of person 350. In order to draw the attention of the user to the corresponding portion of source image 410 that contains the image of person 350, the image of person 350 is highlighted. In an embodiment, the image of person 350 is bounded by box 710 and highlighted by pattern/color 715. The method of highlighting can be any known method of shading, outlining, pointing as known to one of ordinary skill in the art.

The cross-linked source image 410 can be downloaded to the user from notification module 250, or can just be viewed by the user from any type of communication device with a display, such as a mobile communication device, a personal computer, or the like.

VII. Methods

Methods in accordance with embodiments will be described with respect to the intelligent cropping system and methodologies described in FIGS. 1-7.

Figure 8:
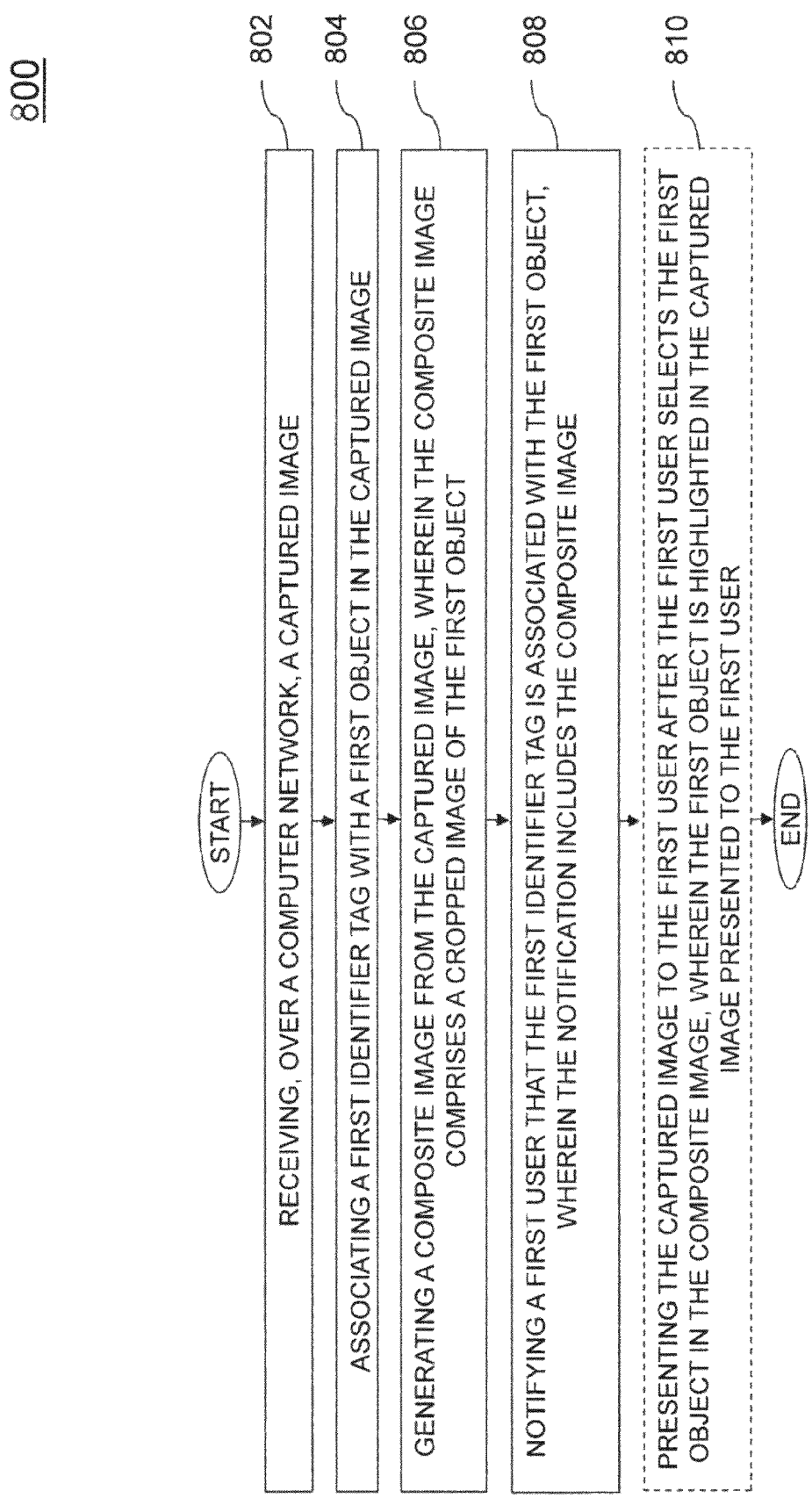
FIG. 8 and FIG. 9 are flowcharts of cross-linking composite image methods, according to an embodiment.

FIG. 8 is a flowchart of an exemplary method 800 for cross-linking from a composite image, according to an embodiment of the present invention. For ease of explanation, method 800 is described with respect to cross-linking composite system 200 of FIG. 2 using the methodology described in FIGS. 1 and 3-7, but embodiments of the method are not limited thereto.

Method 800 starts with step 802 that includes receiving, over a computer network, a source image. In an embodiment, cross-linking composite system 200 receives and stores a source image in image storage device 210 where the image data can exist in any defined image format. Method 800 continues to step 804 by associating a first identifier tag with a first object in the source image. In an embodiment, recognition module 220 of cross-linking composite system 200 analyzes a source image to identify objects and/or people within the image. Association module 230 of cross-linking composite system 200, using the analysis or recognition module 220, associates an identifier tag with an identified object or person with the source image. A source image can contain multiple people and/or objects and thus contain multiple identifier tags.

Method 800 continues to step 806 by generating a composite image from the source image wherein the composite image comprises a cropped image of the first object. In an embodiment, composite image module 240 intelligently crops the source image based on the identified objects and/or people from recognition module 220 and association module 230 of cross-linking composite system 200. In an embodiment, a user may perform the functions of recognition module 220 and association module 230 by identifying and associated a person or object of interest. Whether the person/object is tagged with an identifier by a person or cross-linking composite system 200, imaging cropping module 240 crops the image based on pre-defined rules as discussed above.

For example, when the owner receives a notification from a social media system that a person has tagged persons 320, 330, 340 and 350, cross-linking composite system 200 creates a composite image that would include cropped images 420, 430, 440 and 450 that includes all four tagged persons faces with a minimum of additional image.

Method 800 continues to step 808 by notifying a first user that the first identifier tag is associated with the first object in the cropped image wherein the notification includes the composite image. In an embodiment, notification module 250 notifies the person or object that was associated with an identifier tag by recognition module 220 and association module 230 of the existence of the composite image. The notification also includes a copy of the composite image. In addition, the composite image may also include multiple cropped images of people and/or objects based on the pre-defined rules that govern which objects/people are to be shown in the composite image.

Method 800 optionally continues to step 810 by presenting the source image to the first user after the first user selects the first object in the composite image, wherein the first object is highlighted in the source image presented to the first user. In an embodiment, notification module 710 presents the user with a notification that includes a composite image, such as composite image 710, in which the user has the option of selecting any of the cropped image portions within composite image 710. Selection of a particular cropped image in the composite image results in the user receiving a copy of the source image from which the composite image was generated with the corresponding portion of the selected cropped image being highlighted. Method 800 then concludes.

Figure 9:
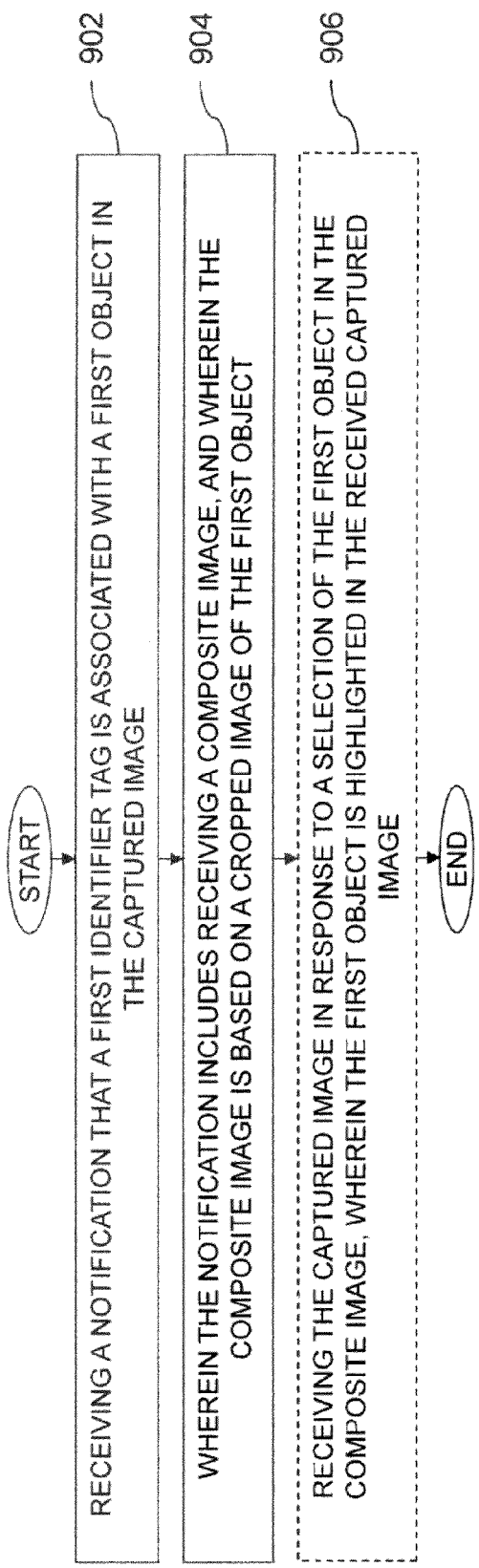

FIG. 9 is a flowchart of an exemplary method 900 for cross-linking of a composite image, according to an embodiment of the present invention. For ease of explanation, method 900 is described with respect to cross-linking composite system 200 of FIG. 2 using the methodology described in FIGS. 1 and 3-7, but embodiments of the method are not limited thereto.

Method 900 starts with step 902 by receiving a notification that a first identifier tag is associated with a first object in the source image. In an embodiment, referring to scenario #1, after the owner submits source image 410 to a social media website, the owner receives a notification that a third party person has tagged persons 320, 330, 340 and 350. Method 900 continues to step 904\*herein the notification includes receiving a composite image, and wherein the composite image is based on a cropped image of the first object. In an embodiment, notification module 250 notifies the person or object that was associated with an identifier tag by recognition module 220 and association module 230 of the existence of the composite image. The notification also includes a copy of the composite image. In addition, the composite image may also include multiple cropped images of people and/or objects based on the pre-defined rules that govern which objects/people are to be shown in the composite image. Method 900 optionally proceeds to step 906 by receiving the source image in response to a selection of the first object in the composite image, wherein the first object is highlighted in the received source image. In an embodiment, notification module 710 presents the user with a notification that includes a composite image, such as composite image 710, in which the user has the option of selecting any of the cropped image portions within composite image 710. Selection of a particular cropped image in the composite image results in the user receiving a copy of the source image from which the composite image was generated with the corresponding portion of the selected cropped image being highlighted. Method 900 then concludes.

VIII. Example Computer System Implementation

Aspects of the present invention shown in FIGS. 1-9, or any part(s) or function(s) thereof, may be implemented using hardware, software modules, firmware, tangible computer readable media having instructions stored thereon, or a combination thereof and may be implemented in one or more computer systems or other processing systems.

Figure 10:
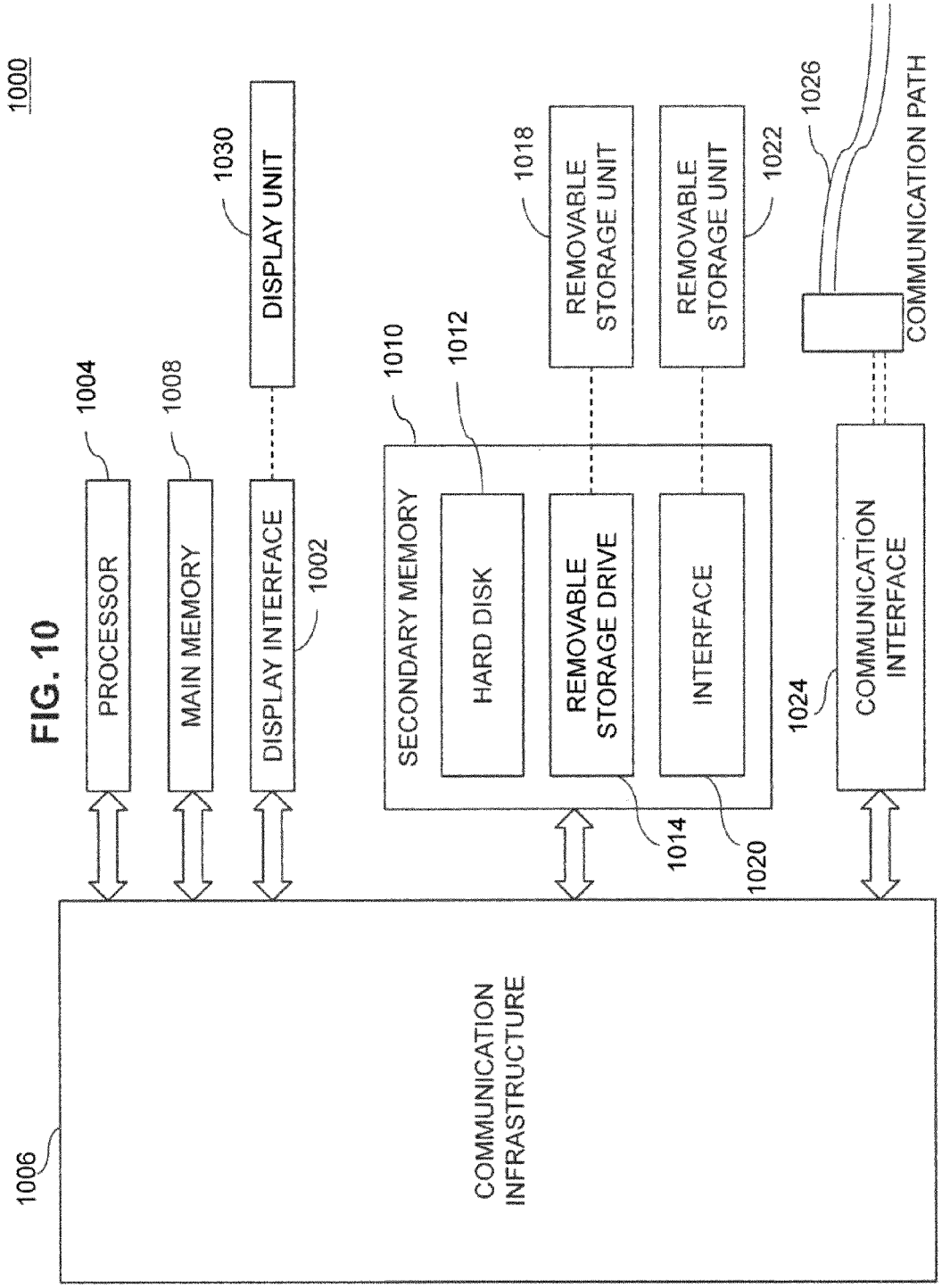
FIG. 10 is a diagram of an example computer system in which embodiments can be implemented.

FIG. 10 illustrates an example computer system 1000 in which embodiments of the present invention, or portions thereof, may be implemented as computer-readable code. For example, system 200 may be implemented in computer system 1000 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-7.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices way have one or more processor "cores."

Various embodiments of the invention are described in terms of this example computer system 1000. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device. As will be appreciated by persons skilled in the relevant art, processor device 1004 may also be a single processor in a multi-core/multiprocessor system, such system operating alone, or in a cluster of computing devices operating in a cluster or server farm. Processor device 1004 is connected to a communication infrastructure 1006, for example, a bus, message queue, network, or multi-core message-passing scheme.

Computer system 1000 also includes a main memory 1008, for example, random access memory (RAM), and may also include a secondary memory 1010. Secondary memory 1010 may include, for example, a hard disk drive 1012, removable storage drive 1014. Removable storage drive 1014 may comprise a floppy disk drive, a magnetic tape drive, an optical disk drive, a flash memory, or the like. The removable storage drive 1014 reads from and/or writes to a removable storage unit 1018 in a well-known manner. Removable storage unit 1018 may comprise a floppy disk, magnetic tape, optical disk, etc. which is read by and written to by removable storage drive 1014. As will be appreciated by persons skilled in the relevant art, removable storage unit 1018 includes a computer usable storage medium having stored therein computer software and/or data.

Computer system 1000 (optionally) includes a display interface 1002 (which can include input/output devices such as keyboards, mice, etc.) that forwards graphics, text, and other data from communication infrastructure 1006 (or from a frame buffer not shown) for display on display unit 1030.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 may be in the form of signals, which may be electronic, electromagnetic, optical, or other signals capable of being received by communications interface 1024. These signals may be provided to communications interface 1024 via a communications path 1026. Communications path 1026 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1018, removable storage unit 1022, and a hard disk installed in hard disk drive 1012. Computer program medium and computer usable medium may also refer to memories, such as main memory 1008 and secondary memory 1010, which may be memory semiconductors (e.g. DRAMs, etc.).

Computer programs (also called computer control logic) are stored in main memory 1008 and/or secondary memory 1010. Computer programs may also be received via communications interface 1024. Such computer programs, when executed, enable computer system 1000 to implement the present invention as discussed herein. In particular, the computer programs, when executed, enable processor device 1004 to implement the processes of the present invention, such as the stages in the method illustrated by flowcharts 800 of FIGS. 8 and 900 of FIG. 9 as discussed above. Accordingly, such computer programs represent controllers of the computer system 1000. Where the invention is implemented using software, the software may be stored in a computer program product and loaded into computer system 1000 using removable storage drive 1014, interface 1020, and hard disk drive 1012, or communications interface 1024.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

IX. Conclusion

Embodiments described herein provide methods and apparatus for the automatic cropping of images. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A computer-implemented method for cross-linking from a cropped image, comprising:
   receiving, over a computer network, a source image;
   associating a first identifier tag with a first object in the source image;
   generating a notification image of at least one cropped object from the source image, including a crop of the first object; and
   notifying a first user that the first identifier tag is associated with the first object, including sending the notification image to the first user.

2. The method of claim 1, further comprising presenting the source image to the first user after the first user selects the first object in the notification image, wherein the first object is highlighted in the source image presented to the first user.

3. The method of claim 1, wherein the notification image is smaller than the source image.

4. The method of claim 1, further comprising:
   associating a second identifier tag with a second object in the source image; and
   notifying the first user that the second identifier tag is associated with the second object.

5. The method of claim 1, wherein the associating is performed by a computer-based recognizing and identifying process.

6. The method of claim 1, wherein the first object is a person.

7. The method of claim 1, wherein the notification includes a source of the associating.

8. The method of claim 4, further comprising notifying a second user, including sending the notification image of the first object to the second user, wherein the notification image does not include the second object.

9. The method of claim 8, wherein the second user is a social media connection of the first object but is not a social media connection of the second object.

10. A computer-implemented method for cross-linking from cropped images, comprising:
    receiving notification that a first identifier tag is associated with a first object in a source image,
    wherein the notification includes receiving a notification image having a cropped image of the first object.

11. The method of claim 10, further comprising receiving the source image in response to a selection of the first object in the notification image.

12. The method of claim 10, wherein the notification image is smaller than the source image.

13. The method of claim 10, further comprising:
    receiving a notification that a second identifier tag is associated with a second object in the source image.

14. The method of claim 10, wherein the first identifier tag is associated with the first object by a computer-based recognizing and identifying process.

15. The method of claim 10, wherein the first object is a person.

16. The method of claim 10, further comprising sending the source image to a social media website, wherein the sending is performed by the owner of the image.

17. The method of claim 10, wherein the notification further comprises a source of the associating.

18. The method of claim 10, wherein the notification further comprises that a second identifier tag is associated with a second object in the source image.

19. The method of claim 18, wherein the notification image includes the first and second objects.

20. A system, comprising:
a processor;
a memory coupled to the processor;
an image storage module configured to be executed by the processor and further configured to store uploaded source images;
an association module configured to be executed by the processor and further configured to associate a first identifier tag with a first object in the source image;
a composite module configured to be executed by the processor and further configured to generate a notification image of at least one cropped object from the source image, including a crop of the first object; and
a notification module configured to be executed by the processor and further configured to notify a first user that the first identifier tag is associated with the first object including sending the notification image to the first user.

21. The system of claim 20, wherein the composite module configured to be executed by the processor is further configured to present the source image to the first user after the first user selects the first object in the notification image, wherein the first object is highlighted in the source image presented to the first user.

\* \* \* \* \*